Jan. 1, 1952  K. O. SISSON  2,580,963
MECHANICAL MOVEMENT
Filed Jan. 31, 1950  3 Sheets-Sheet 1

INVENTOR.
Kenneth O. Sisson
BY
Willits Hardman Tyler
Attorneys

Jan. 1, 1952

K. O. SISSON 2,580,963

MECHANICAL MOVEMENT

Filed Jan. 31, 1950

INVENTOR.
Kenneth O. Sisson
BY Willits, Hardman & Fehr
Attorneys

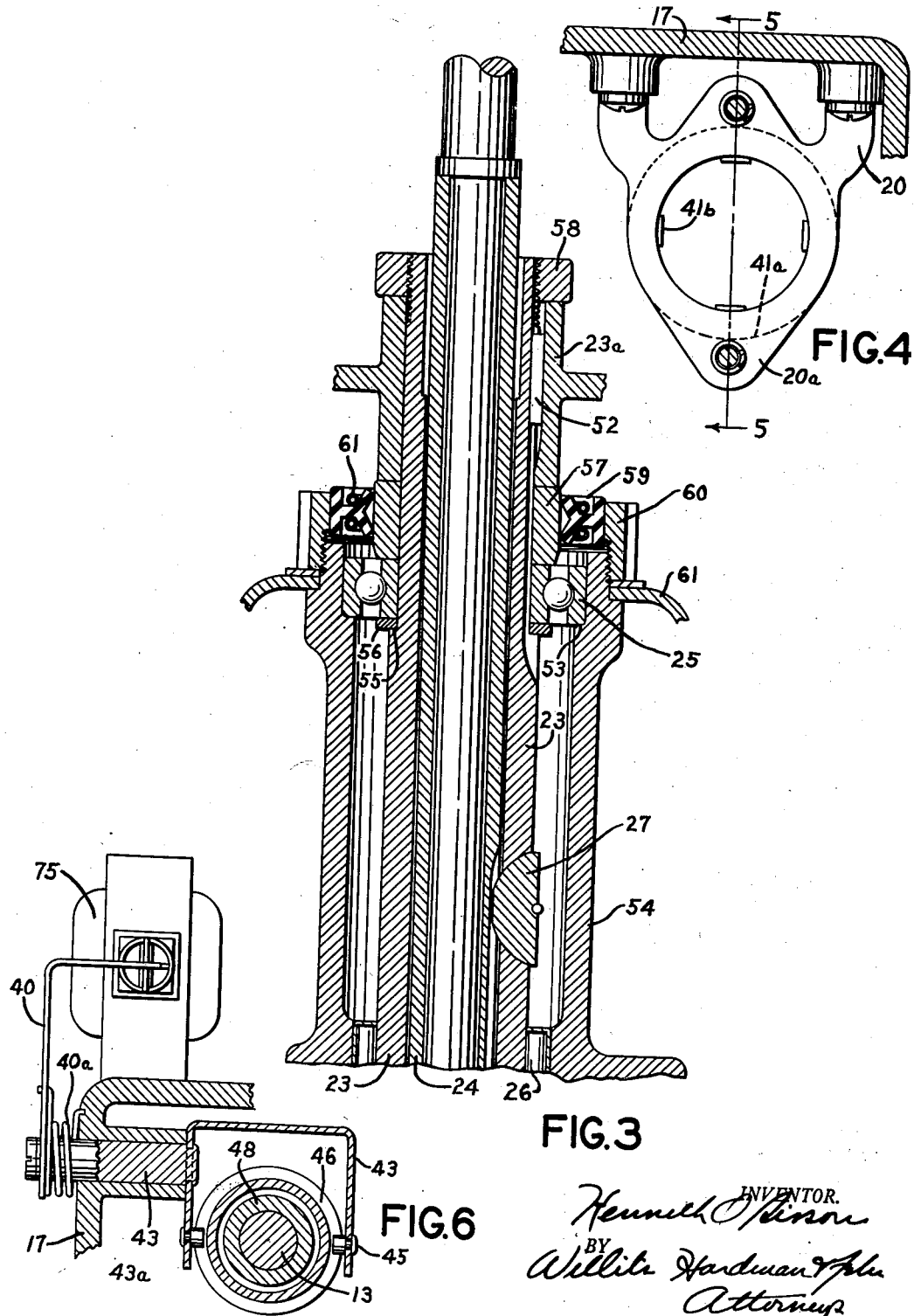

Patented Jan. 1, 1952

2,580,963

UNITED STATES PATENT OFFICE 2,580,963

MECHANICAL MOVEMENT

Kenneth O. Sisson, Oakwood, Ohio, assignor to General Motors Corporation, Dayton, Ohio, a corporation of Delaware Application January 31, 1950, Serial No. 141,456

14 Claims. (Cl. 74—44)

This invention relates to domestic appliances, and more particularly to a power unit for automatic washing machines or the like.

An object of this invention is to provide an improved power unit adapted to impart a reciprocating or oscillating movement to an agitator, and to impart a centrifugal spinning action to the tub of an automatic washing machine or the like.

Another object of this invention is to provide an improved transmission adapted to change the rotary power of a motor into reciprocating or oscillating movement for an agitator, and a spinning movement for the tub of a washing machine or the like.

Further objects and advantages of the present invention will be apparent from the following description, reference being had to the accompanying drawings, wherein a preferred form of the present invention is clearly shown.

In the drawings:

Fig. 3 is a vertical cross-section of the upper part of the power unit, showing mainly the upper part of the co-axial shafts of the unit;

Fig. 4 is a top plan view of the brake disc structure, internal adjoining parts omitted;

Fig. 6 is a horizontal cross-section substantially through the line 6—6 of Fig. 2.

Figure 1:
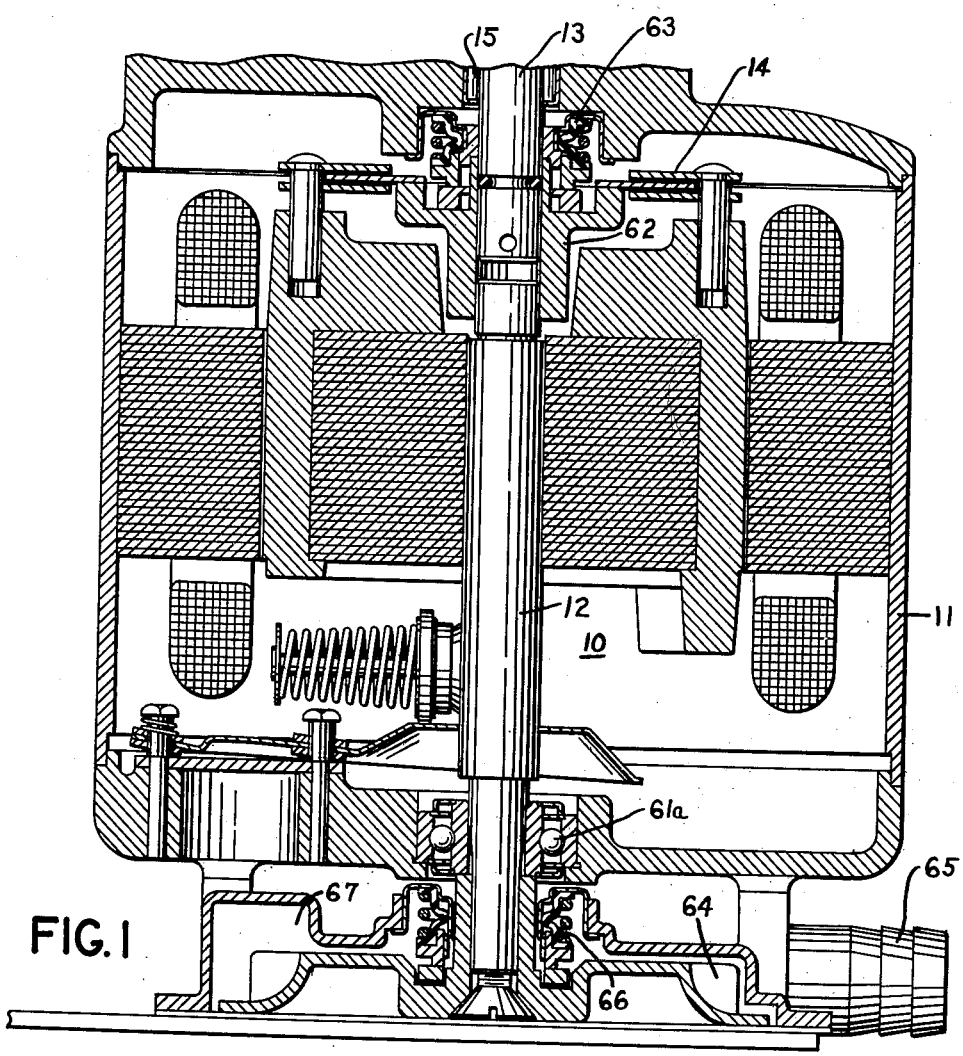
Fig. 1 is a vertical cross-section of the lower part of the power unit, showing mainly the motor thereof.

The power unit preferably includes a rotary electric motor 10, within the lower portion 11 of the unit casing. The motor has a rotary motor shaft 12. The upper end of the motor shaft 12 drives a rotatable driven shaft 13, preferably through the medium of a slip clutch 14, which allows the motor shaft 12 to rotate relatively, if necessary, with respect to the shaft 13. The shaft 13 ordinarily is driven rotatably at the same speed as the motor shaft, since, under normal conditions, the clutch 14 does not slip.

The driven or rotary shaft 13 rotates in aligned bearings 15 and 16 (needle roller bearings, for example) which are placed respectively at the ends of the intermediate portion 17 of the unit casing. A first (pinion) bevel gear 18 is secured to, and surrounds the shaft 13 adjacent the bearing 15. A first (pinion) spur gear 19 is relatively rotatable on, and surrounds, the rotary shaft 13 adjacent the bearing 16. A brake, preferably of the multiple disc type, has one of its two brake members (the fixed brake member) secured to the casing 17 through the medium of a bracket 20, adjacent the spur gear 19. A double acting clutch 21 selectively connects the spur gear 19 to the other brake member (the movable brake member) through the medium of a sleeve 22 or connects the gear 19 to rotary shaft 13. The double acting clutch 21 is controlled by means of a solenoid 75, selectively to connect the spur gear to the stationary member of the brake, or to the rotary shaft 13, in a manner to be more fully described.

Two coaxial shafts 23 and 24 are placed in parallel relationship with the rotary shaft 13. The outer shaft 23 is adapted to be connected to the rotatable tub 23a (the central hub or sleeve only being shown) of a washing machine, and the reciprocatory shaft 24 is adapted to be connected to the agitator (not shown) of a washing machine. The outer shaft 23 is adapted to rotate in bearings 25 and 26 while the inner shaft 24 has its bearings within the shaft 23. Preferably the shafts 23 and 24 are locked by the key 27, so that they must rotate together; but the shaft 24 is free to reciprocate relatively to, and within, the shaft 23.

A straddle mounting 30 is placed within the casing 17 at right angles to the rotary shaft 13. Preferably this includes a second pair of aligned bearings 31 and 32 (also of the needle roller type, if desired) within which a second rotary shaft 33 is adapted to rotate. A second bevel gear 34, and an eccentric 35, are fixed to, and carried by, the rotary shaft 33. The bevel gear 34 meshes with the pinion gear 18, and the eccentric 35 is connected to the coaxial shaft 24 through the medium of the sleeve 36 and connecting rod or link 37, which is provided with a connector lug 38 capable of imparting reciprocation to the shaft 24, but allowing the shaft 24 to rotate with respect to the connector lug 38. This is accomplished by axially locking a rotatable bead 38a, of the shaft 24, within segments of the lug 38, held by sleeve 38b.

The straddle mounting 30 preferably is supported on lugs 50 and 51 without the casing 17.

A second spur gear 39 is connected to the coaxial shaft 23 in fixed relationship, and meshes with, the pinion spur 19.

Figure 2:
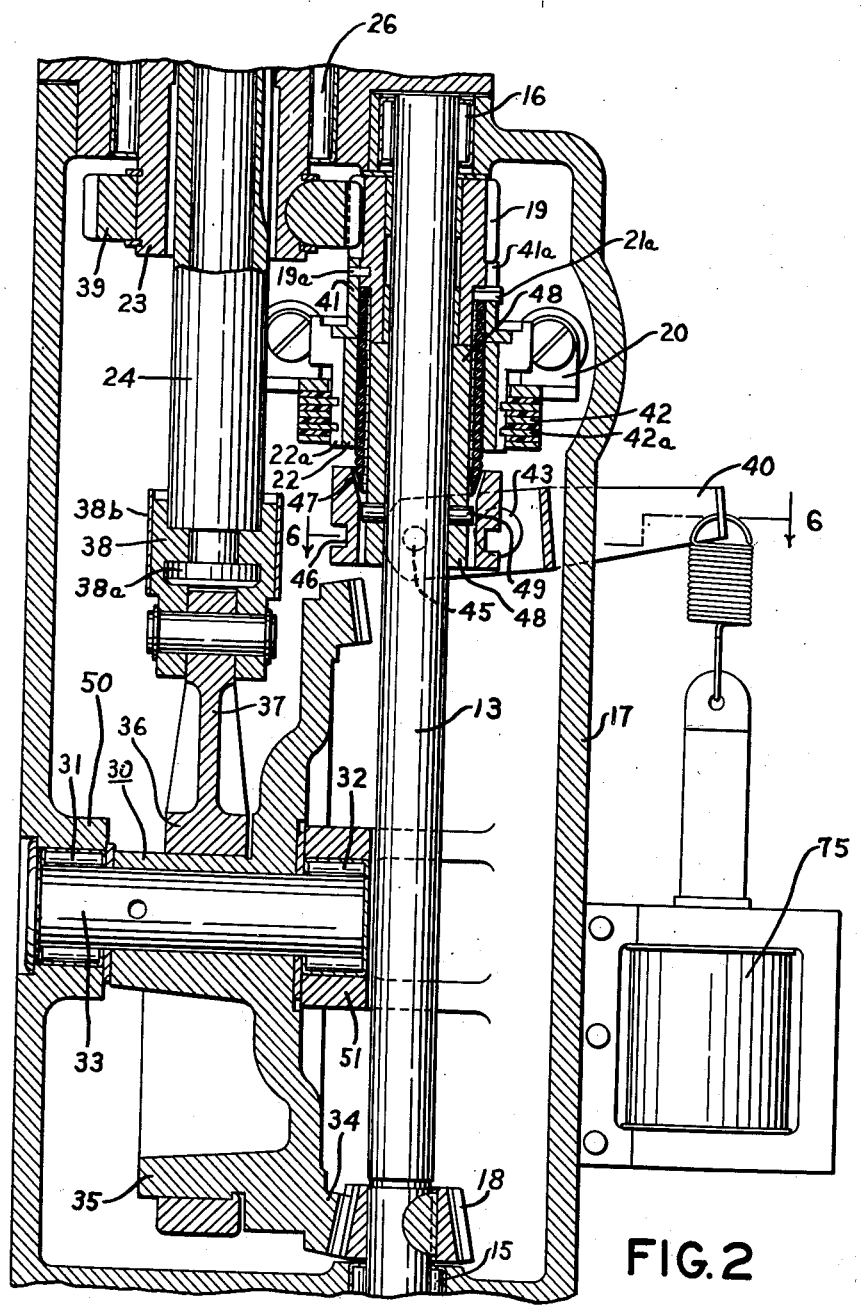
Fig. 2 is a vertical cross-section of the intermediate portion of the power unit, showing mainly the rotary reciprocating transmission mechanism.

The construction is such that, when the motor 10 rotates, and when the solenoid 75 is deenergized to assume the position shown in Fig. 2, the rotary shaft 13 imparts reciprocation to the shaft 24 through the medium of beveled gears 18 and 34, eccentric 35, together with connecting rod 37 and connector 38. At the same time the coaxial shaft 23 is maintained stationary, since the two-way clutch 21 connects the spur gear 19 with the brake member 22, which tends to maintain the gear 19 stationary, and tends to prevent rotation of the shaft 23, and tub 23a. When the solenoid 75 is energized to pull down the lever 40, then the two-way clutch 21 is connected to the shaft 13, in a manner to impart rotation to the spur gear 19, which in turn rotates the spur gear 39 and coaxial shaft 23.

The two-way clutch 21 preferably is of the coiled spring type. One end is secured to the spur gear 19, through the medium of a sleeve 41. The sleeve 41 has a radial slot 41a which receives the outwardly bent end 21a of the spring 21. The sleeve 41 is keyed to the gear 19 by the pin 19a. The spring 21 normally tends to expand, and tends to lock against the sleeve 22. The sleeve 22 is connected to a series of rotatable discs 41a of the brake member, which are interposed between the stationary discs 42, which are secured to the bracket 20. The spur gear 19 thus normally is held stationary, until the solenoid 75 is energized.

Figure 5:
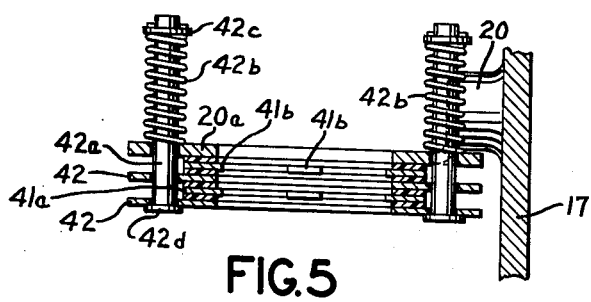
Fig. 5 is a vertical cross-section along the line 5—5 of Fig. 4.

Referring to Figs. 2, 4 and 5 for further details of the brake member, the stationary portion thereof includes the bracket 20 which extends horizontally from the casing 17 in the form of an oblong disc 20a. The stationary discs 42 are also oblong in shape and are locked against rotation by pins 42a, which pass through the discs 42 and 20a. Compression is imparted to these discs by the spring 42b, which act through the medium of washers 42c and heads 42d. The rotatable discs 41a have outer circular peripheries, as indicated by the dotted lines in Fig. 4, and have inward tongues 41b which are received in the slots 22a of the sleeve 22. Thus when the solenoid 75 is not energized the tub 23a is maintained stationary, since the spring 21 is expanded at its lower end against the sleeve 22 and is secured at its upper end to the spur gear 19 through the medium of sleeve 41. This operatively connects the tub to the rotatable, but normally stationary parts of the brake member. When the solenoid 75 is energized, the tub 23a is rotated, since the ring 44 is moved upwardly and contracts the lower end of spring 21 against the rotatable sleeve 48 which is keyed to shaft 13. Simultaneously the spring 21 is disconnected from the stationary sleeve 22. This operatively connects the tub 23a with the rotary shaft 13 to spin the tub.

Further details of the solenoid 75 and its connecting parts are shown in Figs 2 and 6. A lever 40 is carried by and is secured to pin 43, which is rotatable within bearing 43a in casing 17. The lever 40 is normally urged counterclockwise by a spring 40a which has its ends secured respectively to the casing 17 and lever 40, as shown in Fig. 6. The inner end of pin 43 carries a fork 43a which extends around the ring 44, with a pin engagement 45 in the groove 46. Thus rocking movement of the lever 40 imparts vertical reciprocation to the ring 44. The upper portion of the ring 44 is cone-shaped at 47 to engage the lower cone-shaped portion of the spring 21. Sleeve 48 surrounds and is secured to the shaft 13 by means of a pin 49. When the ring 44 is moved upward, the end of the spring 21 is contracted by the action of the cone 47 to cause the spring to wrap around and grip the rotating sleeve 48 thereby causing rotation of the spring 21 and spur gear 19, with simultaneous release of the connection of the spur gear 19 with the brake member.

The tub 23a is locked to the shaft 23 against rotation by a key 52. The outer ring of the bearing 25 rests on a shoulder 53 of the upper portion 54 of the unit casing. The inner ring of the bearing 25 rests on a shoulder 55 and washer 56 on the shaft 23. A ring 57 is interposed between the bearing 25 and the lower end of the tub sleeve 23a. The upper end of the tub sleeve 23a is locked in place by the nut 58 which is threaded on the upper end of shaft 23.

A rubber-like seal ring 59 is interposed between the nut 60 and the ring 57. The ring 59 is preferably made of any of the well known rubber-like compounds which are resistant to lubricants. Coiled springs 61 compress the inner lobes of the ring 59 against the ring 57.

The nut 60 locks the partition wall 61 of the washing machine casing against the upper part of the casing 54 and thus supports the power unit within the casing. The partition wall 61 may be the upper part of a resilient cone-shaped support on which the power unit may be suspended, the general arrangement of the washing machine being broadly the same as shown in the patent to Clark, No. 2,366,236, patented January 2, 1945.

The motor shaft 12 is supported at the lower end by a ball bearing 61a and at its upper end by the sleeve 62 of the slip clutch 14. The sleeve 62 also surrounds the lower end of the shaft 13, so that the motor shaft in effect is held by bearings 61a and 15.

A rotary seal 63 prevents oil from passing through the portion of the casing shown in Fig. 2 into the motor casing.

The lower end of the shaft 12 drives a pump rotor 64 which is adapted to pump water from a hose connection from the upper part of the washing machine, as shown in the Clark patent, and into the discharge connection 65 for discharging the water into a drain or stationary tub. A rotary seal 66 prevents water from flowing out of the pump chamber 67.

In the operation of the machine, the washing machine tub is filled with water and clothes. The motor 10 is energized to rotate shaft 12. The solenoid 75 remains deenergized, so that rotary shaft 13 does not drive gears 19 and 39 but does drive bevel gears 18 and 34 to reciprocate shaft 24 and the agitator carried thereby, the tub remaining stationary. After a suitable length of time, the solenoid 75 is energized, under the control of a suitable timer, if desired, thus locking gear 19 to rotary shaft 13 and causing rotation of tub 23a. During acceleration of the tub, the slip clutch 14 allows the motor 10 to continue at high speed and high power output thus bringing the tub to normal rotation quickly. When the clothes have been properly wrung by tub rotation, the solenoid 75 is deenergized and thus the tub is connected and subjected to the braking action of the brake discs 41a, 42.

While the form of embodiment of the invention as herein disclosed, constitutes a preferred form, it is to be understood that other forms might be adopted, as may come within the scope of the claims which follow.

What is claimed is as follows:

1. In combination: a motor having a motor shaft; a driven shaft in axial alignment with and driven by said motor shaft; a first bevel gear secured to and surrounding said driven shaft; a first spur gear relatively rotatable on and surrounding said driven shaft; a brake; a double acting clutch selectively connecting said spur gear to said brake and driven shaft respectively;

two coaxial shafts in parallel relationship with said driven shaft; a second bevel gear and an eccentric operably connected respectively to said first bevel gear and to one of said coaxial shafts; and a second spur gear operably connected to the other of said coaxial shafts and to said first spur gear.

2. In combination: a motor having a motor shaft; a driven shaft in axial alignment with and driven by said motor shaft through the medium of a slip clutch; a first bevel gear secured to and surrounding said driven shaft; a first spur gear relatively rotatable on and surrounding said driven shaft; a brake; a double acting clutch selectively connecting said spur gear to said brake and driven shaft respectively; two coaxial shafts in parallel relationship with said driven shaft; a second bevel gear and an eccentric operably connected respectively to said first bevel gear and to one of said coaxial shafts; and a second spur gear operably connected to the other of said coaxial shafts and to said first spur gear.

3. In combination: a motor having a motor shaft; a driven shaft in axial alignment with and driven by said motor shaft; a first bevel gear secured to and surrounding said driven shaft; a first spur gear relatively rotatable on and surrounding said driven shaft; a brake; a double acting helical spring clutch selectively connecting said spur gear to said brake and driven shaft respectively; two coaxial shafts in parallel relationship with said driven shaft; a second bevel gear and an eccentric operably connected respectively to said first bevel gear and to one of said coaxial shafts; and a second spur gear operably connected to the other of said coaxial shafts and to said first spur gear.

4. In combination: a motor having a motor shaft; a driven shaft in axial alignment with and driven by said motor shaft; a first bevel gear secured to and surrounding said driven shaft; a first spur gear relatively rotatable on and surrounding said driven shaft; a brake; a double acting clutch selectively connecting said spur gear to said brake and driven shaft respectively; two coaxial shafts in parallel relationship with said driven shafts; a second bevel gear and an eccentric operably connected respectively to said first bevel gear and to the inner one of said coaxial shafts; and a second spur gear operably connected to the other of said coaxial shafts and to said first spur gear.

5. In combination: a motor having a motor shaft; a driven shaft in axial alignment with and driven by said motor shaft; a first bevel gear secured to and surrounding said driven shaft; a first spur gear relatively rotatable on and surrounding said driven shaft; a brake; a double acting clutch selectively connecting said spur gear to said brake and driven shaft respectively; a solenoid controlling said double acting clutch; two coaxial shafts in parallel relationship with said driven shaft; a second bevel gear and an eccentric operably connected respectively to said first bevel gear and to one of said coaxial shafts; and a second spur gear operably connected to the other of said coaxial shafts and to said first spur gear.

6. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting clutch selectively connecting said spur gear to the other of said brake members and to said rotary shaft respectively; two coaxial shafts in parallel relationship with said rotary shaft; a second bevel gear and an eccentric rotatably mounted in said casing and operably connected respectively to said first bevel gear and to one of said coaxial shafts; and a second spur gear operably connected to the other of said coaxial shafts and to said first spur gear.

7. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting helical spring clutch selectively connecting said spur gear to the other of said brake members and to said rotary shaft respectively; two coaxial shafts in parallel relationship with said rotary shaft; a second bevel gear and an eccentric rotatably mounted in said casing and operably connected respectively to said first bevel gear and to one of said coaxial shafts; and a second spur gear operably connected to the other of said coaxial shafts and to said first spur gear.

8. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting clutch selectively connecting said spur gear to the other of said brake members and to said rotary shaft respectively; two coaxial shafts in parallel relationship with said rotary shaft; a second bevel gear and an eccentric rotatably mounted in said casing and operably connected respectively to said first bevel gear and to the inner one of said coaxial shafts; and a second spur gear operably connected to the other of said coaxial shafts and to said first spur gear.

9. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting clutch selectively connecting said spur gear to the other of said brake members and to said rotary shaft respectively; a solenoid controlling said double acting clutch; two coaxial shafts in parallel relationship with said rotary shaft; a second bevel gear and an eccentric rotatably mounted in said casing and operably connected respectively to said first bevel gear and to one of said coaxial shafts; and a second spur gear operably connected to the other of said coaxial shafts and to said first spur gear.

10. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting clutch selectively connecting said spur gear to the other of said brake members and to said rotary shaft respectively; two coaxial shafts in parallel relationship with said rotary shaft; a second pair of aligned bearings at right angles to said first named pair of aligned bearings; a second rotary shaft mounted in said second pair of aligned bearings; a second bevel gear and an eccentric carried by said second rotary shaft and operably connected respectively to said first bevel gear and to one of said coaxial shafts; and a second spur gear operably connected to the other of said coaxial shafts and to said first spur gear.

11. In combination: an elongated casing; a pair of aligned bearings at the ends of said casing; a rotary shaft in said bearings; a first bevel gear secured to and surrounding said rotary shaft adjacent one of said bearings; a first spur gear relatively rotatable on and surrounding said rotary shaft adjacent the other of said bearings; a brake having one of its two brake members secured to said casing adjacent said spur gear; a double acting clutch selectively connecting said spur gear to the other of said brake members and to said rotary shaft respectively; two coaxial shafts in parallel relationship with said rotary shaft; a straddle mounting in said casing at right angles to said rotary shaft; a second bevel gear and an eccentric rotatably carried by said straddle mounting and operably connected respectively to said first bevel gear and to one of said coaxial shafts; and a second spur gear operably connected to the other of said coaxial shafts and to said first spur gear.

12. In combination, an elongated casing, a motor at one end of the casing having a shaft, a rotatable shaft and a reciprocable shaft protruding from the opposite end of the casing, a rotatable gear and reciprocating means connected together and rotatably mounted upon an axis at right angles to said shafts and the motor shaft, means operably connecting said reciprocating means and said reciprocable shaft, drive means operably connecting said motor shaft and said rotatable gear for reciprocating said shaft, and drive means including a set of spur gears operably connecting said motor shaft and said rotatable shaft.

13. In combination, an elongated casing, a motor at one end of the casing having a shaft, a rotatable shaft and a reciprocable shaft protruding from the opposite end of the casing, a rotatable gear and reciprocating means connected together and rotatably mounted upon an axis at right angles to said shafts and the motor shaft, means operably connecting said reciprocating means and said reciprocable shaft, drive means operably connecting said motor shaft and said rotatable gear for reciprocating said shaft, and drive means including a set of spur gears and a clutch operably connecting said motor shaft and said rotatable shaft.

14. In combination, an elongated casing, a motor at one end of the casing having a shaft, a rotatable shaft and a reciprocable shaft protruding from the opposite end of the casing, a rotatable gear and reciprocating means connected together and rotatably mounted upon an axis at right angles to said shafts and the motor shaft, means operably connecting said reciprocating means and said reciprocable shaft, drive means operably connecting said motor shaft and said rotatable gear for reciprocating said shaft, and drive means including a set of spur gears and a double throw clutch having one position operably connecting said motor shaft and said rotatable shaft, a brake means connected to the casing, said double throw clutch means having a second position operably connecting said rotatable shaft and said brake means.

KENNETH O. SISSON.

REFERENCES CITED

The following references are of record in the file of this patent:

UNITED STATES PATENTS

| Number | Name | Date |
|---|---|---|
| 1,261,545 | Johnson | Apr. 2, 1918 |
| 1,437,514 | Graydon | Dec. 5, 1922 |